Nov. 27, 1956 H. J. HOOD ET AL 2,771,827
X-RAY PROCESSING HANGER
Original Filed Jan. 25, 1952 2 Sheets-Sheet 1
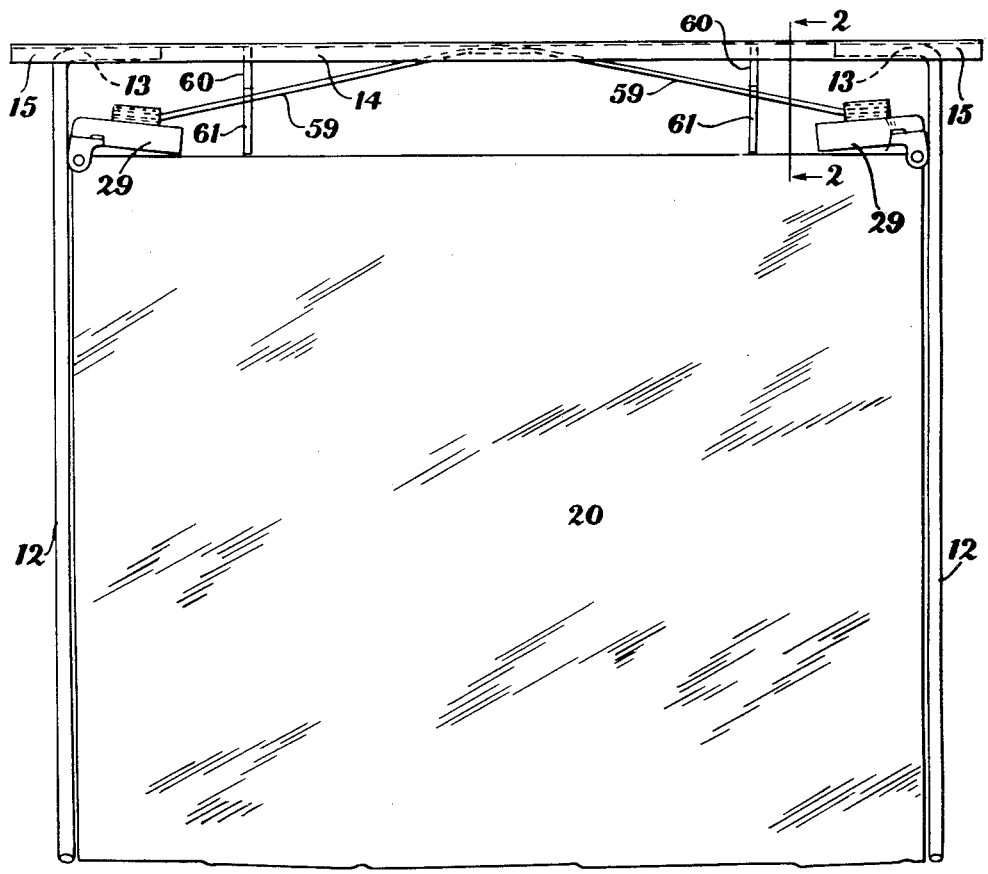
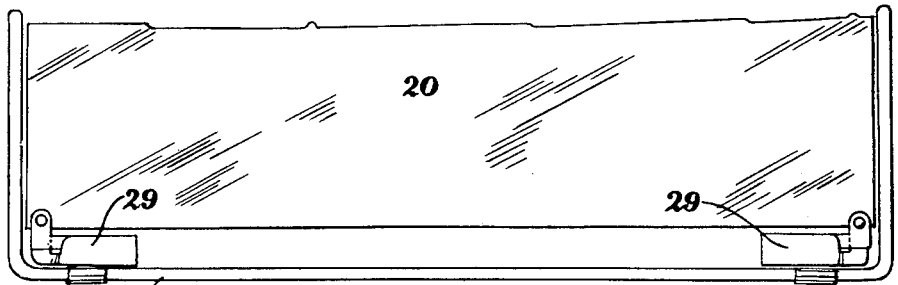
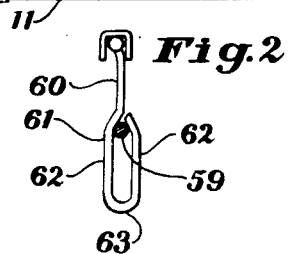
Fig. 2
Fig. 1
INVENTORS
HENRY J. HOOD
CARL F. NOWACK
EDMUND M. VAN HOESEN
BY
ATTORNEYS

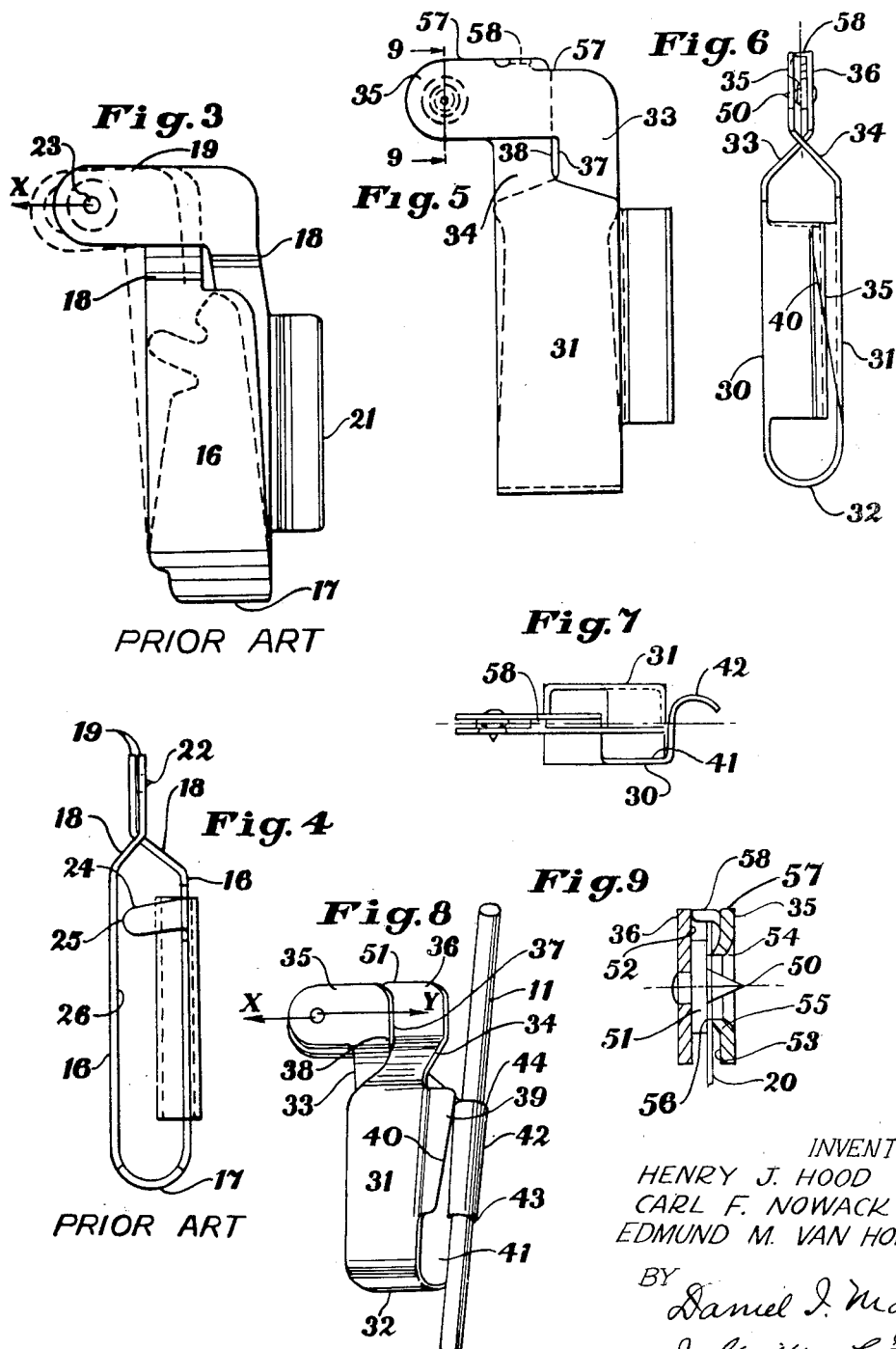

United States Patent Office 2,771,827
Patented Nov. 27, 1956

2,771,827
X-RAY PROCESSING HANGER

Henry J. Hood, Carl F. Nowack, and Edmund M. Van Hoesen, Rochester, N. Y., assignors to Eastman Kodak Company, Rochester, N. Y., a corporation of New Jersey Original application January 25, 1952, Serial No. 268,294. Divided and this application February 2, 1953, Serial No. 334,652

1 Claim. (Cl. 95—100)

The present invention relates to film hangers, and more particularly to hangers adapted to support and tension a film sheet, such as X-ray film, to retain the sheet in a stretched planar relation. This application is a division of our prior application Ser. No. 268,294, filed January 25, 1952.

The principal object of the invention is the provision of a new and improved type of film enaging clip for such hangers.

Another object of the invention is the provision of a type of clip of the class described, which has a pair of overlying film engaging jaws which are held against movement in opposite directions in the plane of the film and normal to the clip supporting member.

Yet another object of the invention is the provision of a film clip formed with clamping jaws which securely engage the film, yet are secured and positively retained in slightly spaced relation to provide adequate drainage of the photographic solutions between the jaws.

Still another object of the invention is the provision of a pair of movable clips with means to position the clips relative to the supporting hanger as well as the film sheet.

To these and other ends, the invention resides in certain improvements and combinations of parts, all as will be hereinafter more fully described, the novel features being pointed out in the claim at the end of the specification.

In the drawings:

Fig. 1 is a front elevation view of a film hanger and clip arrangement constructed in accordance with the present invention;

Fig. 2 is a vertical sectional view of a portion of the hanger construction illustrated in Fig. 1, and taken substantially on line 2—2 thereof, showing the means for maintaining the upper flexibily mounted clips in proper relation to the hanger;

Fig. 3 is a front elevation view of one form of film clip used prior to the present invention;

Fig. 4 is a side elevation view of the prior type of clip illustrated in Fig. 3;

Fig. 5 is a front elevation view of the new and improved type of clip of the present invention;

Fig. 6 is a side elevation view of the clip illustrated in Fig. 5;

Fig. 7 is an end view of the clip illustrated in Figs 5 and 6;

Fig. 8 is a perspective view of the new and improved clip, showing one manner of connecting the clip to a support, such as, for example, as the lower rod of a film hanger of the type illustrated in Fig. 1; and Fig. 9 is a vertical sectional view through the film engaging jaws of the clip taken substantially on line 9—9 of Fig. 5, showing the relation of the film impaling members, and the arrangement for maintaining the film clamping jaws in slightly spaced parallel relation.

Similar reference numerals throughout the various views indicate the same parts.

The present invention relates to a film hanger which may be formed from a rod, strip, or other form of material to provide a hollow U-shaped frame having a bottom rod 11 and opposite spaced sides 12. The upper ends of the sides 12 are bent inwardly towards each other, as shown at 13, and are secured to a top member which, in the present embodiment, is in the form of a channel member 14. The top member 14, as in common practice, is provided with laterally extending portions 15 which project beyond sides 12 to support the hanger, in a suspended relation, on the top of a suitable processing tank, as is well known.

As the hanger so far described may be of any standard construction, and forms no part of the present invention, further details are not deemed necessary. Also, the showing and description of this particular form of hanger is not deemed as a limitation, but only as an illustration of one type of hanger with which the clip structure of the present invention may be used. Therefore, the details of the hanger itself may be varied widely without in any way altering the structure of the present invention.

The hanger above described and illustrated in Fig. 1 is primarily used to support and tension a sheet of film. The term "film" as used in the present specification and claim is employed in its generic sense to cover the usual cut sheet film, sheet X-ray film, paper sheets or any other type of sheet material which is to be held in a tensioned planar relation. With such hangers, it is common practice to provide the hanger with suitable clips positioned to engage the sheet adjacent its four corners to secure the sheet in place on the hanger. In some types of hangers the lower clips are mounted on and connected directly to the bottom of the member 11. However, in order to stretch or tension the film sheet the top clips may be yieldably mounted so as to cooperate with the lower clips to stretch or tension the sheet therebetween, as later described.

Various types of film engaging clips have been used with such hangers. One such form of clip is shown in Figs. 3 and 4. This clip is formed from a single strip of spring metal which is bent on itself, as shown in Fig. 4, to provide a pair of spaced parallel members 16 which are connected at one end by a curved resilient portion 17. The other ends of the members 16 are formed to provide neck portions 18 which have a width less than that of the member 16, as best shown in Fig. 3. These neck portions are arranged in a crossover relation and terminate in flat, elongated film gripping members or jaws 19 which are adapted to receive and clamp a corner of the film sheet 20. It will be observed from Fig. 4 that due to the crossover relation of the neck portions 18, the left jaw member 19 is connected to the right member 16, while the right hand jaw member is connected to the left member 16, all of which is well known in the art. The upper member 16, Fig. 3, which is the right hand member 16, Fig. 4, is provided with a laterally projecting curved lug 21 for connecting the clip to the hanger or bottom 11 thereof.

With this type of prior clip, the right hand member 16, Fig. 4, or the bottom member, Fig. 3, is stationary. On the other hand, the left member 16, Fig. 4, or the upper member 16, Fig. 3, is movable. The result is that when the two members 16 are gripped and pressed towards each other, the movable member 16 will move towards and relative to the stationary member 16 and against the spring action of the curved portion 17 to separate the jaws 19. When, however, the pressure is released, the tensioned member 17 serves to move the member 16 apart to bring the jaws 19 into closed relation, as shown in Fig. 4.

It has been common practice with clips of the type shown in Figs. 3 and 4, to provide one of the jaws with a film impaling member in the form of a pin 22, which will pierce the film sheet. The other jaw 19 usually is formed with an aperture or recess 23 in alignment with and adapted to receive the free end of the pin 22, as shown in Figs. 3 and 4. Usually the pin is on the stationary member while the recess is on a movable member. It is obvious, however, that this arrangement may be reversed. In addition, the stationary member 16 is formed with a depending lug 24 the free end 25 of which is adapted to engage the inner surface 26 of the movable member when the members are pressed together to limit the opening movement of the jaws 19, all of which is deemed apparent to those familiar with such clip structures.

With the above-described structure of the clips illustrated in Figs. 3 and 4, in mind, attention is called specifically to the structure illustrated in Fig. 3. In this figure the movable member 16 lies above the fixed member 16, and the neck 18 of the movable member crosses over the neck 18 of the stationary member so that the jaw 19 connected to the movable member underlies the jaw 19 connected to the fixed member. Also, the neck 18 of the movable member lies to the left of the neck 18 of the fixed member. In other words, the neck of the movable member is between the film sheet 20 and the neck of the stationary member. Now, with such an arrangement, when any pressure or force is applied to the movable member or jaw in the direction "X," Fig. 3, will tend and may actually move the movable member and its associated jaw to the dotted position, Fig. 3. Such moving force may result, for example, from a pull on the film, catching the hanger on an adjacent hanger or on the edge of the processing tank. Such movement of the movable member jaw relative to the stationary jaw will move the hole or recess 23 out of registering relation with the impaling pin 22. Such out-of-registry relation will render the jaw structure less operative in securing the corner of the film strip in clamped relation between the jaw members, the disadvantage of which is apparent to those in the art.

Referring now to Fig. 4, it is apparent that when jaws 19 are in their closed or film gripping relation, the inner surfaces of the jaws are in contact with the opposite faces of the film over the entire area of the jaws. The result is that there is no proper access of processing liquid to the film area between the jaws. Also, adequate drainage is not provided at this point, the disadvantages of which are deemed apparent.

In order to overcome these disadvantages, the present invention provides a new and improved form of film clip, generally indicated by the numeral 29 and illustrated in detail in Figs. 5–9 inclusive. Like the clip illustrated in Figs. 3 and 4, the new clip of the present invention is formed from a strip of spring metal and is bent upon itself to provide a pair of spaced parallel members 30 and 31 which are connected at one end by a resiliently curved member 32. The member 30 is formed with a laterally extending curved lug 42, to be later more fully described, which may be secured in any suitable manner to a support such, for example, as the bottom rod 11 of the hanger illustrated in Fig. 1. Therefore, as the member 30 is secured to the rod 11, it is designated as the stationary or fixed member. On the other hand, the member 31 is not so restrained and may be designated as the movable member. The members 30 and 31, like the structure illustrated in Figs. 3 and 4, are provided with neck portions 33 and 34, respectively, of reduced width and arranged in a crossover relation. These crossed neck portions terminate in flat film engaging jaws 35 and 36. The result is that, as illustrated in Fig. 8, the jaw 36 of the upper movable member 31 is positioned beneath the jaw 35 of the lower stationary member 30. Also, referring to Fig. 8, it is apparent that the neck 34 of the movable member 31 is positioned to the right of neck 33 of the stationary member 30. This arrangement is just the reverse of that of the prior clip structure illustrated in Figs. 3 and 4. The result is that when a force is applied in the direction "X," Fig. 8, this force will tend to move the movable member 31 and its associated jaw 36 to the left relative to the fixed jaw 35. However, any such tendency to so move the parts will cause the left edge 37 of the neck 34 at the point of crossover of the neck portions to engage the right edge 38 of the stationary neck portion 33. Such engagement will effectively arrest any movement of the neck 34 and jaw 36 to the left relative to the fixed jaw 35. The result is that the relative position of the jaw members 35 and 36 is always maintained so that the impaling pin and its cooperating recess or aperture, to be later more fully described, will never be moved out of registering relation; but, on the contrary, will always be in proper cooperating relation securely to engage and clamp the clip to the film.

In order to limit the opening movement of jaws 35 and 36, the movable member 31 is formed with a depending lug 39 of the shape best shown in Fig. 8. When the movable member 31 is pressed toward the member 30 the jaws 35 and 36 are separated or opened. This opening movement may be continued until the lower tapered edge 40 of the lug 39 finally engages the upper or inner surface 41 of the stationary member 30 to thus arrest further movement of the members 30 and 31 and to limit the opening movement of the jaws 35 and 36, as is deemed apparent from an inspection of Fig. 8. The lug 39 is positioned on the right side or edge of the movable member 31, see Fig. 8, and adjacent the curved lug 42 which is formed from the material of the member 30 to connect the latter to its support, such as the rod 11. In order to secure positive engagement of the lug 39 with the lug 42 in all positions of the member 30, for a reason to be presently described, the curvature or shape of the lug 42 along its length may be varied. For example, at point 43, the lug 42 may have a radius of curvature equal to or substantially equal to the radius of rod 11. However, at the opposite end 44, the lug 42 is of angular shape so that the lug 42 may project slightly above the rod 11 and in the path of lug 39 in all positions of the latter as is clearly illustrated in Fig. 8.

From an inspection of Fig. 8, it is now apparent that if force is applied to the jaw 36 in the direction of "Y," this force will tend to move jaw 36, member 31 and lug 39 to the right, as viewed in this figure. Such movement will bring the lug 39 into direct and positive engagement with the lug 42 or at least the elevated portion 44 thereof to prevent or limit such rightward movement of the jaw 36. The parts are so designed that engagement of the lugs 39 and 42 will occur before jaw 36 has been moved far enough to shift the impaling pin and its recess out of registering relation. Thus, the engagement of the edges 37 and 38 of the neck portions 33 and 34, will prevent relative movement of the jaws 35 and 36 in the direction "x" or upwardly as viewed in Fig. 1. On the other hand, engagement of lugs 39 and 42 will prevent relative movement of the jaws 35 and 36 in the opposite direction or downward, as viewed in Fig. 1. Therefore, by the use of this blocking or stop means, the jaws are held against relative movement in opposite directions and are maintained in proper film clamping relation. This limitation of movement is in the plane of the film and normal to the lower supporting rod 11 or to the upper supporting member to be later described. Also, the lug 39 performs two functions: (1) it limits the opening movement of the jaws 35 and 36; and (2) it prevents or limits rightward movement of the jaw 36 relative to the jaw 35, all of which is deemed apparent from an inspection of Fig. 8.

Referring again to Figs. 3 and 4, it is apparent that the jaw members 19 engage the film sheet over the flat area of the jaws. As mentioned above, such form of clamping prevents or reduces proper application of the processing solution to such area and materially reduces proper drainage of the solution therefrom. In order to overcome these undesirable features, the jaws 35 and 36 of the clip of the present invention are so designed as to engage the film sheet over a minimum area.

Referring now to Fig. 9, it is seen that the impaling pin 50 is secured to the movable jaw 36 and is formed with a circular boss 51 which lies against the inner face 52 of the jaw 36 and serves to support the film sheet over only a small area and in spaced relation from said face 52. Also, the boss 51 cooperates with a flange, to be later described, to space the film sheet from the inner face 53 of the jaw 35. Thus, the film is suspended between the inner jaw surfaces. The jaw 35 is formed with a circular aperture 54 in registry with and through which the impaling pin 50 projects. The edge of the aperture 54 is turned inward to form an annular flange 55 the periphery 56 of which engages the film sheet 20 substantially along an annular line only, and cooperates with the boss 51 to hold the film sheet in spaced relation between the jaws and over a minimum area of contact, all as most clearly illustrated in Fig. 9. Also, the cooperating boss 51 and flange 55 serve to maintain the jaws 35 and 36 in slightly spaced parallel relation to permit free passage and drainage of the processing liquid between the jaws, so as to insure proper and adequate processing of this area of the film. Furthermore, to insure the proper spaced parallel relation of jaws 36 and 35, the latter has formed on its upper edge 57 an inwardly bent lug 58 which projects toward and is adapted to engage the inner face 52 of jaw 36 when the jaws are in closed or film clamping position, as shown in Fig. 9. Thus, lug 58 cooperates with boss 51 and flange 55 to maintain the jaws 35 and 36 in a slightly spaced parallel relation, and also to provide the minimum engagement of the film sheet by the jaws.

As is common practice, the lower clips 29 may be secured in a fixed position on the lower rod 11 of the hanger, as illustrated in Fig. 1. However, it is also common practice to impart a slight tension to the film sheet to stretch the latter to hold it in a taut, planar relation on the hanger. In order to secure such tension, the upper pair of clips may be yieldably or flexibly mounted so that they may be moved relative to the lower clips to stretch the film therebetween, as is common practice. To this end, the top member 14 has secured thereto a pair of cantilever members 59 formed of a flexible or resilient material and carrying on their free ends clips 29, which are identical in structure to those above described and secured to the lower rod 11. In practice, the lower corners of the film sheet are secured to the lower fixed clips 29. The upper clips are then grasped and pulled down to connect the upper film clips to the sheet. Such pulling down flexes or tensions the cantilever members 59. The result is that upon release of the members 59, the upper clips tend to move upward and relative to the lower clips so as to cooperate therewith to pull or tension the film strip therebetween to maintain the film in a flat position on the hanger. While only the upper clips are mounted on the resilient cantilever members 59, the lower clips may also be so mounted, if desired. In addition, the upper film clips are mounted on the cantilever members 59 in the same relation as the lower clips so that the cooperating neck portions and the lugs 39 and 42 will prevent movement of the movable jaw 35 in an up or down direction, as viewed in Fig. 1, so as to maintain the jaw members in cooperating relation, as more fully described in connection with the lower clip members.

While the flexible mounting of the upper clips serves to tension or stretch the film, such mounting has certain inherent disadvantages. In the first place, one or both of the members 59 may be bent in a direction out of the plane of the drawings so that the upper clips may be positioned out of the plane of the hanger proper. Such misaligned clips may readily catch on adjacent hangers or the clips secured thereto. Second, if too small a film sheet is placed in the hanger, the upper film clip may be pulled down to such an extent as to bend the member 59 beyond its elastic limit. When this is done, the member 59 will no longer be effective to move the upper clip upward to tension the film, the disadvantages of which are deemed apparent.

In order to overcome these disadvantages, the present invention provides positioning and limiting means for the upper cantilever members 59, and their associated clips 29. To this end, the top channel member 14 has secured thereto a pair of laterally spaced depending rods 60, as best shown in Fig. 1. The lower end of each of these rods 60 is bent to form a loop 61, as best shown in Fig. 2, through which the resilient member 59 extends or projects loosely. Now, any attempt to move the member 59 or its clip out of the plane of the hanger will serve to bring the member 59 into positive engagement with a side 62 of the loop 61 to prevent such movement. The particular side 62 engaged by the member 59 will depend, of course, on the direction of movement. Also, when the upper clips pull down to engage an upper corner of the film, the bottom 63 of loop 61 will be engaged by the member 59 to limit the downward movement of the latter. The bottom 63 is so positioned that the member 59 will engage the bottom 63 before the member 59 has been bent beyond its elastic limit. Of course, the top of the loop will serve to limit the upward movement of the cantilever member 59. The result is that the member 59 will always retain its resiliency and will be effective to stretch or tension the film. Thus, the loop 61 serves not only to maintain the lateral alignment of the members 59 and associated clips, but also prevents excess bending of the members 59 so that the latter will retain their resilient character and thus be effective to provide the desired film stretching.

Thus, the present invention provides a new and improved film clip which insures proper positioning of the film gripping members, engages the film over a minimum area, properly spaces the gripping jaws to insure proper distribution and drainage of the processing liquids. Also, the upper clips are retained in proper positive relation to the hanger so that the clips are yieldably supported so as to cooperate with the lower fixed clips to tension or stretch the film.

While one embodiment of the invention has been disclosed, it is to be understood that the inventive idea may be carried out in a number of ways, therefore, this application is not to be limited to the precise details described but is intended to cover all variations and modifications which fall within the scope of the appended claim.

What we claim and desire to secure by Letters Patent of the United States is:

A sheet film hanger comprising, in combination, a hollow rectangular frame, a pair of film clips fixedly secured to one side of said frame to engage adjacent corners of a film sheet, a pair of resilient cantilever members secured to the opposite side of said frame, film clips mounted directly on the free ends of said members to engage an opposite pair of corners of said sheet and to cooperate with said first pair of clips to maintain said sheet in a tensioned planar relation on said hanger, means fixedly positioned on said hanger and cooperating with said cantilever members to maintain the clips thereon in the plane of said sheet, but permitting limited movement of said member relative to said means in the plane of said sheet, and means on said last mentioned means adapted to be engaged by said cantilever members to limit the movement of the clips thereon in opposite directions in the plane of said sheet.

References Cited in the file of this patent

UNITED STATES PATENTS

| | | |
|---|---|---|
| 1,237,562 | Schoenberg | Aug. 21, 1917 |
| 1,563,858 | Ingve | Dec. 1, 1925 |
| 2,352,601 | Burke | July 4, 1944 |
| 2,410,131 | Sardeson et al. | Oct. 29, 1946 |
| 2,450,178 | Albert | Sept. 28, 1948 |